United States Patent
Naruse et al.

(10) Patent No.: US 8,159,432 B2
(45) Date of Patent: Apr. 17, 2012

(54) LIQUID CRYSTAL DISPLAY DEVICE

(75) Inventors: Yohichi Naruse, Gifu (JP); Takashi Ochi, Tenri (JP); Masumi Kubo, Ikoma (JP); Akihiro Yamamoto, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 674 days.

(21) Appl. No.: 11/992,252

(22) PCT Filed: Sep. 21, 2006

(86) PCT No.: PCT/JP2006/318741
§ 371 (c)(1),
(2), (4) Date: Mar. 20, 2009

(87) PCT Pub. No.: WO2007/034876
PCT Pub. Date: Mar. 29, 2007

(65) Prior Publication Data
US 2009/0213053 A1    Aug. 27, 2009

(30) Foreign Application Priority Data
Sep. 22, 2005    (JP) ................................. 2005-276419

(51) Int. Cl.
*G09G 3/36* (2006.01)
(52) U.S. Cl. .......................................... 345/88; 345/698
(58) Field of Classification Search ............ 345/87–104, 345/204, 690–699
See application file for complete search history.

(56) References Cited

U.S. PATENT DOCUMENTS

| | | | |
|---|---|---|---|
| 6,335,778 B1 * | 1/2002 | Kubota et al. | ................. 349/151 |
| 6,936,845 B2 | 8/2005 | Kim et al. | |
| 6,958,791 B2 | 10/2005 | Shimoshikiryo | |
| 7,034,789 B2 | 4/2006 | Takeuchi et al. | |
| 7,079,214 B2 | 7/2006 | Shimoshikiryo | |
| 2003/0227429 A1 * | 12/2003 | Shimoshikiryo | ............... 345/90 |
| 2004/0239698 A1 | 12/2004 | Kamada et al. | |
| 2005/0030439 A1 | 2/2005 | Lyu | |
| 2005/0057483 A1 | 3/2005 | Sekido et al. | |
| 2005/0122441 A1 | 6/2005 | Shimoshikiryoh | |

(Continued)

FOREIGN PATENT DOCUMENTS
EP    0 685 756 A2    5/1995
(Continued)

OTHER PUBLICATIONS

International Search Report for PCT/JP2006/318741 mailed Oct. 24, 2006.

(Continued)

*Primary Examiner* — Stephen Sherman
(74) *Attorney, Agent, or Firm* — Nixon & Vanderhye P.C.

(57) ABSTRACT

A liquid crystal display device includes a plurality of pixels each connected to a signal line via a switching element. Each pixel includes first and second sub-pixels having voltage vs. luminance characteristics different from each other with respect to a signal voltage supplied from the signal line. A threshold signal voltage of the first sub-pixel is lower than that of the second sub-pixel. The pixels form color display pixels which are red, green pixel and blue pixels. Where the area ratio of the first sub-pixel in each of the red, green and blue pixels is SR1, SG1 and SB1, and the ratio of the lighting-up time period of the first sub-pixel of each of the red, green and blue pixels in one vertical scanning period is TR1, TG1 and TB1, the relationship of (SR1×TR1)>(SG1×TG1)>(SB1×TB1) holds.

6 Claims, 5 Drawing Sheets

U.S. PATENT DOCUMENTS

| | | |
|---|---|---|
| 2005/0162360 A1 | 7/2005 | Ishihara et al. |
| 2005/0184944 A1 | 8/2005 | Miyata et al. |
| 2006/0028589 A1 | 2/2006 | Um et al. |
| 2007/0064008 A1* | 3/2007 | Childers .................. 345/589 |

FOREIGN PATENT DOCUMENTS

| | | |
|---|---|---|
| EP | 0 685 756 A3 | 5/1995 |
| JP | 05-289108 | 11/1993 |
| JP | 2005-241932 | 9/2005 |
| JP | 2005-250085 | 9/2005 |
| WO | WO 2004/046793 | 6/2004 |

OTHER PUBLICATIONS

English translation of the International Preliminary Report on Patentability mailed Apr. 3, 2008 in corresponding PCT Application No. PCT/ JP2006/318741.

Supplementary EP Search Report mailed May 10, 2010 in corresponding EP application 06810401.7.

* cited by examiner

LIQUID CRYSTAL DISPLAY DEVICE

This application is the U.S. national phase of International Application No. PCT/JP2006/318741, filed 21 Sep. 2006, which designated the U.S. and claims priority to Japanese Patent Application No. 2005-276419, filed 22 Sep. 2005, the entire contents of each of which are hereby incorporated by reference.

TECHNICAL FIELD

The present invention relates to a liquid crystal display device, and specifically to a color liquid crystal display device.

BACKGROUND ART

Liquid crystal display devices have recently been improved in the display quality and are now widely used for TVs, but are still strongly desired to be further improved in the display quality.

One problem unique to liquid crystal display devices is that the display quality varies in accordance with the angle at which the display is observed (viewing angle), namely, that the so-called viewing angle characteristic is lowered. In conventional TN mode liquid crystal display devices, the grayscale is occasionally inverted. The liquid crystal display devices which are widely used today can display images at a contrast ratio of 10 or greater in a relatively wide viewing angle range, but still have the problem that the grayscale characteristic ($\gamma$ characteristic) is dependent on the viewing angle.

In order to solve this problem, the so-called pixel division technique is proposed. "Pixel division" refers to a method by which the luminance, that is conventionally displayed with one pixel, is displayed with 2 or more sub-pixels obtained by dividing one pixel in a space-wise or time-wise manner. The two or more sub-pixels include at least a bright sub-pixel displaying a luminance higher than the luminance to be displayed and a dark sub-pixel displaying a luminance lower than the luminance to be displayed. The technique of space-wise pixel division is described in, for example, Patent Documents 1 through 3. The technique of time-wise pixel division is described in, for example, Patent Document 4.

Patent Document 1: Japanese Laid-Open Patent Publication No. 2004-62146
Patent Document 2: Japanese Laid-Open Patent Publication No. 2004-78157
Patent Document 3: Japanese Laid-Open Patent Publication No. 2005-189804
Patent Document 4: Japanese Laid-Open Patent Publication No. 2005-173573
Non-patent Document 1: Shinpen Shikisai Kagaku Handbook (Color Science Handbook, Revised) (2nd ed.), edited by the Color Science Association of Japan, published by University of Tokyo Press, pp. 1026-1027, 1303 (1998)

DISCLOSURE OF THE INVENTION

Problems to be Solved by the Invention

However, the viewing angle dependence of the grayscale characteristic (also referred to as the "$\gamma$ characteristic") cannot be completely compensated for even by using the techniques described in Patent Documents 1 through 4.

This problem will be described with the technique of space-wise pixel division described in Patent Documents 1 through 3 with reference to FIG. 1.

FIG. 1(a) schematically shows a structure of one pixel $P_0$ of a conventional liquid crystal display device of the vertical alignment mode (VA mode) with no pixel division. FIG. 1(b) is a graph schematically showing the input grayscale vs. luminance characteristic thereof. FIG. 1(c) schematically shows a structure of one pixel P of a liquid crystal display device of the VA mode having a pixel division structure. FIG. 1(d) is a graph schematically showing the input grayscale vs. luminance characteristic thereof.

The conventional VA mode liquid crystal display device shown in FIG. 1(a) has the input grayscale vs. luminance characteristic shown in FIG. 1(b). In order to obtain a prescribed luminance at a front viewing angle (in the direction normal to the display screen), the grayscale characteristic is set to be represented by, for example, a curve of $\gamma=2.2$. However, when the viewing angle (polar angle from the direction normal to the display screen) is 45° (such a viewing angle will be referred to as the "oblique 45° viewing angle"), the grayscale characteristic significantly deviates from the curve of $\gamma=2.2$. The azimuth angle direction representing the grayscale characteristic of FIG. 1(b) is parallel or perpendicular to the transmission axes of a pair of polarizing plates, which are located in a crossed Nicols state while having a liquid crystal layer therebetween. In the following description, the azimuth angle direction is as described above unless otherwise specified.

By contrast, as shown in FIG. 1(c), in a liquid crystal display device described in Patent Documents 1 through 3 in which one pixel P includes a first sub-pixel SP1 and a second sub-pixel SP2, the deviation of the grayscale characteristic at the oblique 45° viewing angle from the grayscale characteristic at the front viewing angle (the curve of $\gamma=2.2$) is smaller.

For example, it is assumed that the first sub-pixel is a bright sub-pixel displaying a luminance higher than the luminance to be displayed, and the second sub-pixel is a dark sub-pixel displaying a luminance lower than the luminance to be displayed. In FIG. 1(d), the part on the low grayscale side is mainly governed by the characteristic of the first sub-pixel SP1, and the part on the high grayscale side is mainly governed by the characteristic of the second sub-pixel SP2. In consideration of the transmittance (grayscale) characteristic of the two sub-pixels with respect to the signal voltage supplied to the pixel P (V-T characteristic), the first sub-pixel SP1 has a lower optical threshold voltage $V_0$th and the second sub-pixel SP2 has a higher optical threshold voltage $V_0$th.

As described in Patent Documents 1 through 3, in a structure in which a bright sub-pixel and a dark sub-pixel are formed by providing the two sub-pixels with storage capacitances electrically independent from each other and thus making a difference between the voltages to be supplied to the storage capacitance counter electrodes of the storage capacitances, there are advantages that a signal voltage can be supplied from a signal line common to the two sub-pixels SP1 and SP2 and a common scanning line is usable (for example, FIG. 12 of Patent Document 1). This structure is also highly effective in improving the grayscale characteristic on the low grayscale side (the side closer to the black display) and thus is highly effective in improving the display quality. In this structure, the other electrodes of the storage capacitances (storage capacitance electrodes) are supplied with a voltage which is the same as the signal voltage supplied from the signal line to the sub-pixels.

As represented by the grayscale characteristic in FIG. 1(d), the viewing angle dependence of the grayscale characteristic is lowered but the curve at the oblique 45° viewing angle matches the curve at the front viewing angle only at one point (in a very small range). Namely, at a specific grayscale level, the luminance scarcely changes even when the viewing angle is inclined; whereas at the other grayscale levels, the luminance changes when the viewing angle is inclined (when the polar angle is increased). Such a change in the luminance appears as a color change in color display.

Needless to say, it is possible to further lower the viewing angle dependence of the grayscale characteristic (color reproducibility) by increasing the number of sub-pixels into which the pixel is divided in a space-wise or time-wise manner, but this naturally raises the cost. In order to present a liquid crystal display device capable of displaying high quality images at a reasonable price to the market, it is desired to improve the grayscale characteristic (color reproducibility) without increasing the number of sub-pixels into which the pixel is divided.

The present invention made in light of the above-described points has an object of lowering the viewing angle dependence of the grayscale characteristic (color reproducibility) of a liquid crystal display device without increasing the number of sub-pixels into which the pixel is divided by a pixel division structure.

Means for Solving the Problems

A liquid crystal display device according to the present invention includes a plurality of pixels each connected to a signal line via a switching element. Each of the plurality of pixel includes a first sub-pixel and a second sub-pixel having voltage vs. luminance characteristics different from each other with respect to a signal voltage supplied from the signal line, a threshold signal voltage of the first sub-pixel being lower than that of the second sub-pixel. The plurality of pixels form color display pixels including a red pixel, a green pixel and a blue pixel. Where the area ratio of the first sub-pixel in each of the red pixel, the green pixel and the blue pixel is SR1, SG1 and SB1, and the ratio of a time period in which the first sub-pixel of each of the red pixel, the green pixel and the blue pixel is lit up with respect to one vertical scanning period is TR1, TG1 and TB1, the relationship of (SR1×TR1)>(SG1× TG1)>(SB1×TB1) holds.

In one embodiment, it is preferable that the relationships of 0.15<(SR1×TR1): 1.00, 0.03<(SG1×TG1)<0.75, and 0.02< (SB1×TB1)<0.71 are fulfilled. Furthermore, it is preferable that the relationships of 0.42<red (SR1×TR1)<0.95, 0.22<green (SG1×TG1)<0.78, and 0.15<blue (SB1×TB1) <0.44 are fulfilled.

In one embodiment, it is preferable that the red pixel has a point, at which an input grayscale vs. luminance curve at the front viewing angle matches an input grayscale vs. luminance curve at the oblique 45° viewing angle, within the grayscale level range of 105/255 or greater and 255/255 or less; the G pixel has a point, at which the input grayscale vs. luminance curve at the front viewing angle matches the input grayscale vs. luminance curve at the oblique 45° viewing angle, within the grayscale level range of 52/255 or greater and 223/255 or less; and the B pixel has a point, at which the input grayscale vs. luminance curve at the front viewing angle matches the input grayscale vs. luminance curve at the oblique 45° viewing angle, within the grayscale level range of 44/255 or greater and 217/255 or less.

In one embodiment, the ratio of the time period in which the first sub-pixel of each of the red pixel, the green pixel and the blue pixel is lit up with respect to one vertical scanning period, i.e., TR1, TG1 and TB1, are each 1.00.

Effects of the Invention

In a liquid crystal display device according to the present invention, the area ratio and/or the ratio of the lighting-up time period of the sub-pixel is set such that the skin color reproducibility does not change in accordance with the viewing angle. Therefore, the viewing angle dependence of the grayscale characteristic (color reproducibility) of the liquid crystal display device can be decreased without increasing the number of sub-pixels into which a pixel is divided by a pixel division structure.

DESCRIPTION OF THE REFERENCE NUMERALS

10 Pixel
10a, 10b Sub-pixel
12a, 12b Scanning line
14 Signal line
16a, 16b TFT
18a, 18b Sub-pixel electrode
100 Liquid crystal display device

BEST MODE FOR CARRYING OUT THE INVENTION

The present inventors made studies on the improvement of the grayscale characteristic (color reproducibility) while the number of sub-pixels into which one pixel is divided is kept relatively small, e.g., while the number of sub-pixels is the minimum number of 2.

For the color reproducibility of a display device, memory colors are considered important. In most cases, an image displayed on a display device cannot be directly compared with a subject of display. Therefore, the relationship between the displayed image and the image memorized by the observer is important. For a display device used for TVs, the color of the skin of humans (hereinafter, referred to as the "skin color") is considered especially important among memory colors (see, for example, Non-patent Document 1).

Figure 1:
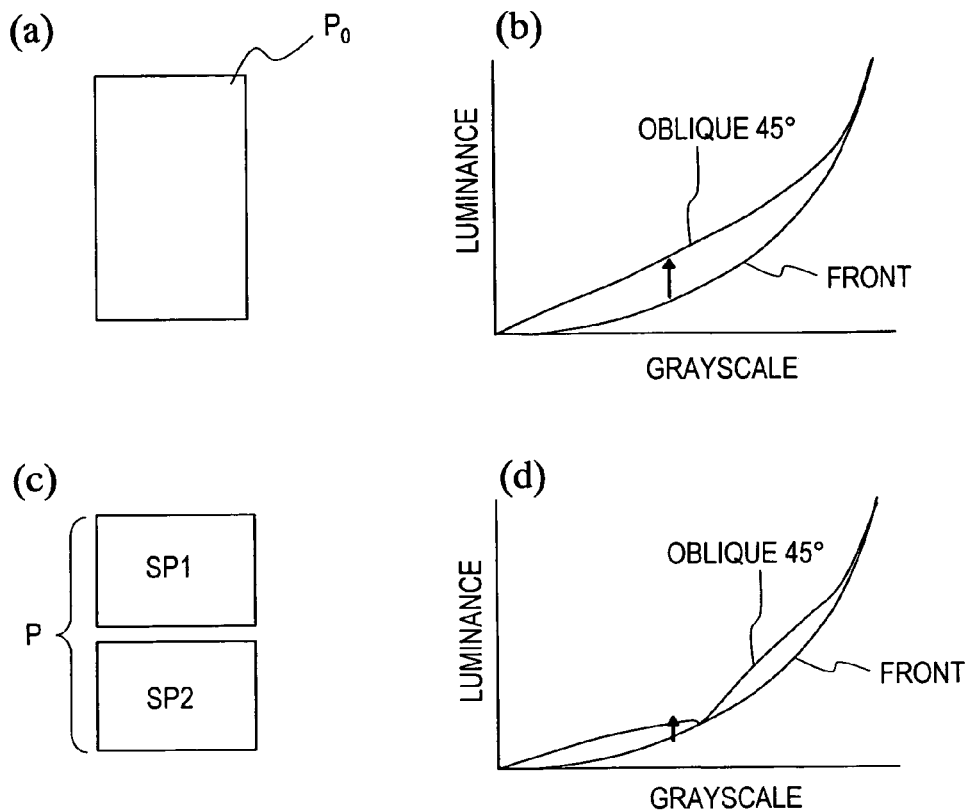
FIG. 1 (a) schematically shows a structure of one pixel $P_0$ of a conventional liquid crystal display device of the vertical alignment mode (VA mode) with no pixel division; (b) is a graph schematically showing the input grayscale vs. luminance characteristic thereof; (c) schematically shows a structure of one pixel P of a liquid crystal display device of the VA mode having a pixel division structure; and (d) is a graph schematically showing the input grayscale vs. luminance characteristic thereof.
Figure 2:
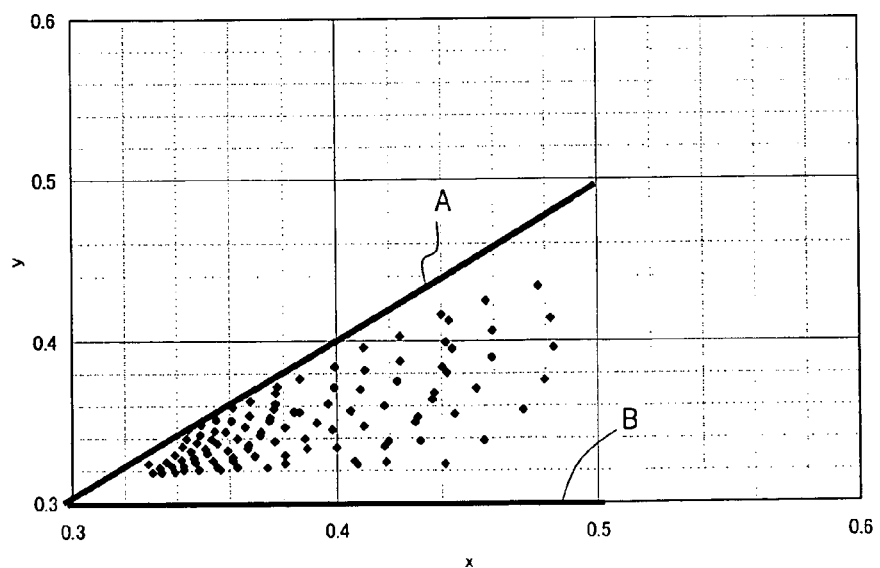
FIG. 2 shows a skin color distribution of Japanese men and women shown in the CIE color system, which is converted from the Muncell color system.

FIG. 2 shows a skin color distribution of Japanese men and women in the CIE color system, which is converted from the Muncell color system shown on page 1303 of Non-Patent Document 1. As understood from FIG. 2, the skin colors of Japanese men and women are existent in the range which has x and y of $0.3 \leq x$, $y \leq 0.5$ and also is sandwiched between straight lines A and B. According to Jamie Sherrah et al., the skin color is existent in a range limited in accordance with the hue regardless of the ethnicity (see, for example, http://homepages.inf.ed.ac.uk/rbf/CVonline/LOCAL_COPIES/GONG1/cvOnline-skinColourAnalysis.html, FIG. 1). According to the study of the present inventors, the hue range of the skin color shown in FIG. 1 of the above webpage mostly matches the range shown in FIG. 2. The present inventors sampled 25 skin colors (of the ethnicities including white, black and yellow races) from various images and displayed each skin color with grayscale levels of three primary colors of R (red), G (green) and B (blue) (256 grayscale levels from level 0 through level 255). The results are shown in Table 1. Table 1 also shows the maximum value and the minimum value of each primary color.

TABLE 1

| Skin color | R | G | B |
|---|---|---|---|
| 1 | 208 | 144 | 105 |
| 2 | 226 | 180 | 150 |
| 3 | 192 | 154 | 130 |
| 4 | 192 | 156 | 129 |
| 5 | 194 | 154 | 136 |
| 6 | 233 | 190 | 165 |
| 7 | 119 | 93 | 83 |
| 8 | 203 | 141 | 121 |
| 9 | 218 | 177 | 151 |
| 10 | 152 | 97 | 66 |
| 11 | 182 | 124 | 96 |
| 12 | 255 | 201 | 175 |
| 13 | 180 | 154 | 138 |
| 14 | 184 | 162 | 151 |
| 15 | 171 | 128 | 111 |
| 16 | 180 | 139 | 119 |
| 17 | 208 | 145 | 130 |
| 18 | 141 | 96 | 77 |
| 19 | 173 | 120 | 112 |
| 20 | 159 | 101 | 94 |
| 21 | 184 | 125 | 121 |
| 22 | 136 | 89 | 61 |
| 23 | 206 | 171 | 151 |
| 24 | 246 | 223 | 217 |
| 25 | 105 | 52 | 44 |
| max | 255 | 223 | 217 |
| min | 105 | 52 | 44 |

As understood from Table 1, the grayscale levels of R, G and B are different from one another. In addition, the range of the grayscale levels (the range from the minimum level to the maximum level) are quire large as follows: the range is from level 105 to level 255 for R, from level 52 to level 233 for G, and from level 44 to level 217 for B. It is also understood that the grayscale levels of the three primary colors for each skin color is in the order of R>G>B from the highest to the lowest.

Figure 3:
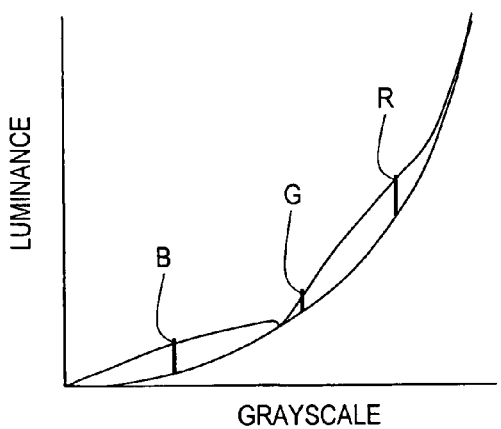
FIG. 3 shows the reason why the color reproducibility of the skin color is decreased depending on the viewing angle in a conventional pixel division structure.

Now, a case where a skin color is displayed on a liquid crystal display device having the grayscale characteristic shown in FIG. 1 will be discussed. Referring to FIG. 3, it is assumed that the displayed skin color has the grayscale levels represented by the positions on the horizontal axis of the R, G and B columns. When the display is observed at the oblique 45° viewing angle, the luminance of each of R, G and B changes by the amount represented by the corresponding column. Namely, the luminance of G scarcely changes, whereas the luminance of R and B significantly changes. In other words, when the viewing angle is inclined, the skin color appears differently.

As described above, the skin color is especially important as a memory color. Therefore, when the skin color reproducibility is poor, the observer considers that the reproducibility of the display device is poor. In order to solve the problem of the poor skin color reproducibility, the viewing angle dependence of the grayscale characteristic is improved using the pixel division technique as follows. The viewing angle dependence is improved for a grayscale level, of each of the three primary colors, which is important for the skin color reproducibility. Namely, instead of providing all the pixels with the same grayscale characteristic, the R pixel, G pixel and B pixel are provided with different grayscale characteristics, respectively.

Hereinafter, an embodiment using the pixel division technique described in Patent Documents 1 through 3 will be described.

In this embodiment, a plurality of pixels P in the liquid crystal display device each include a first sub-pixel SP1 and a second sub-pixel SP2. The first sub-pixel SP1 and the second sub-pixel SP2 are connected to a signal line via a switching element (e.g., a TFT), and have voltage vs. luminance characteristics different from each other with respect to the voltage of the signal supplied from the signal line. In this example, the first sub-pixel SP1 has a threshold signal voltage lower than that of the second sub-pixel SP2. Namely, the first sub-pixel SP1 is a bright sub-pixel displaying a luminance higher than the luminance to be displayed by the pixel, and the second sub-pixel SP2 is a dark sub-pixel displaying a luminance lower than the luminance to be displayed by the pixel.

The plurality of pixels P form color display pixels. Each of the color display pixels consists of an R pixel, a G pixel and a B pixel. The color display pixel is the minimum unit of color display. The R pixels, the G pixels and the B pixels are arranged in, for example, stripes. The area ratio between the first sub-pixel SP1 and the second sub-pixel SP2 is different among the R pixel, the G pixel and the B pixel. Where the ratio of the area of the first sub-pixel SP1 with respect to the total area of each of the R pixel, the G pixel and the B pixel is SR1, SG1 and SB1, the relationship of SR1>SG1>SB1 holds. Where the ratio of the area of the second sub-pixel SP2 with respect to the total area of each of the R pixel, the G pixel and the B pixel is SR2, SG2 and SB2, the relationship of SR2<SG2<SB2 holds because SR2=1−SR1, SG2=1−SG1, and SB2=1−SB1.

Where the R pixel, the G pixel and the B pixel are formed such that the area ratios of the first sub-pixel SP1 fulfill the relationship of SR1>SG1>SB1, the grayscale level, at which the viewing angle dependence of the grayscale characteristic is most improved by the pixel division structure, is highest for red, next highest for green and lowest for blue. This matches the above-described order of the grayscale levels of red, green and blue for the skin colors.

Figure 4:
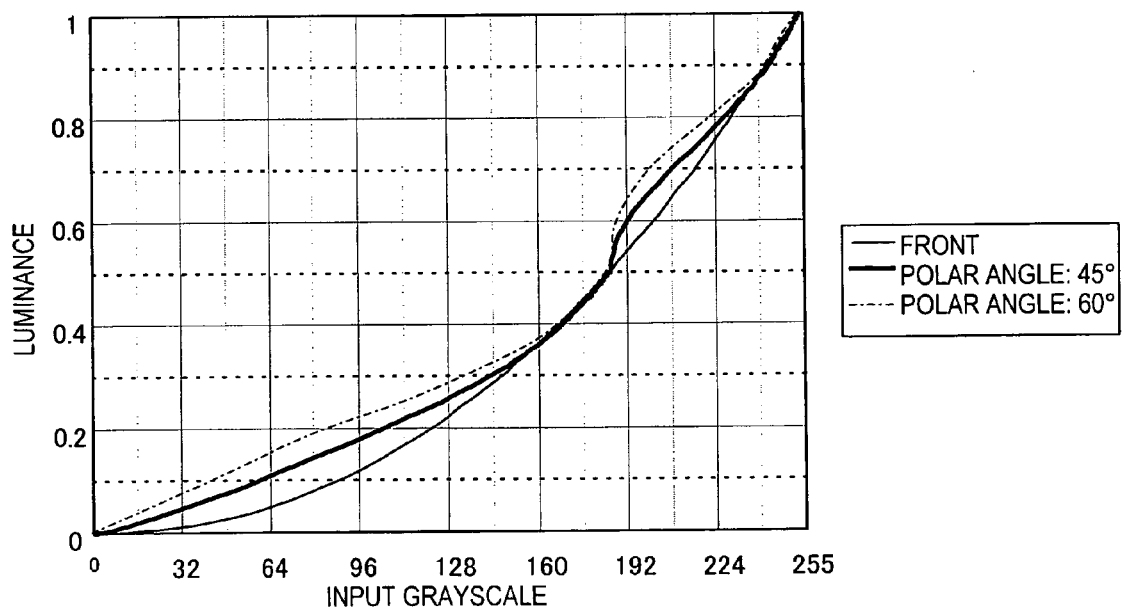
FIG. 4 is a graph showing the grayscale characteristics where the area ratio between a first sub-pixel SP1 and a second sub-pixel SP2 is 1:1 in the conventional pixel division structure.

As an example, FIG. 4 shows the grayscale characteristics in the case where the area ratio between the first sub-pixel SP1 and the second sub-pixel SP2 is 1:1. FIG. 4 shows the grayscale characteristics at the front viewing angle, the oblique 45° viewing angle, and the oblique 60° viewing angle. As described above with reference to FIG. 3, where the R, G and B pixels each have the grayscale characteristic shown in FIG. 4, when the viewing angle is increased, the skin color reproducibility is decreased.

Figure 5:
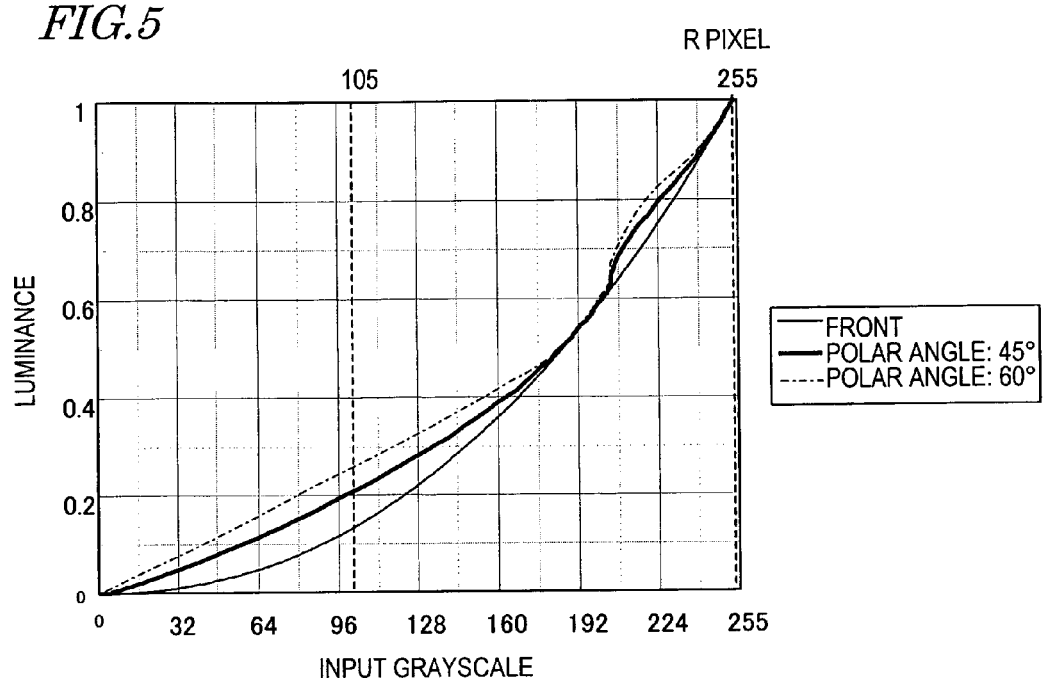
FIG. 5 is a graph showing the grayscale characteristics of an R pixel of a liquid crystal display device according to an embodiment of the present invention.
Figure 6:
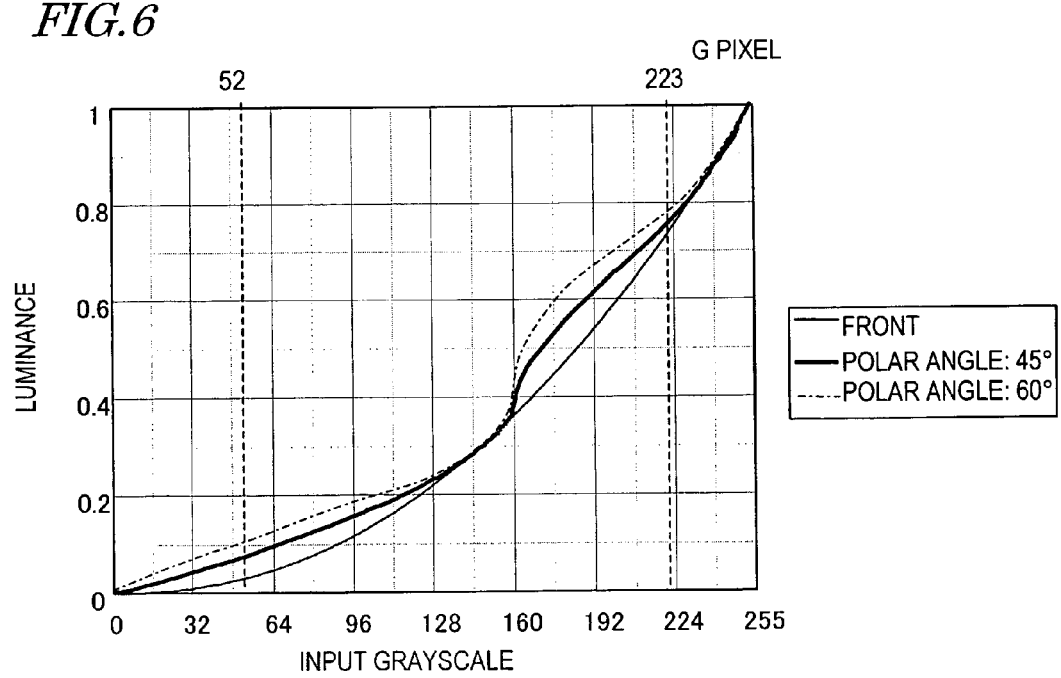
FIG. 6 is a graph showing the grayscale characteristics of a G pixel of the liquid crystal display device according to the embodiment of the present invention.
Figure 7:
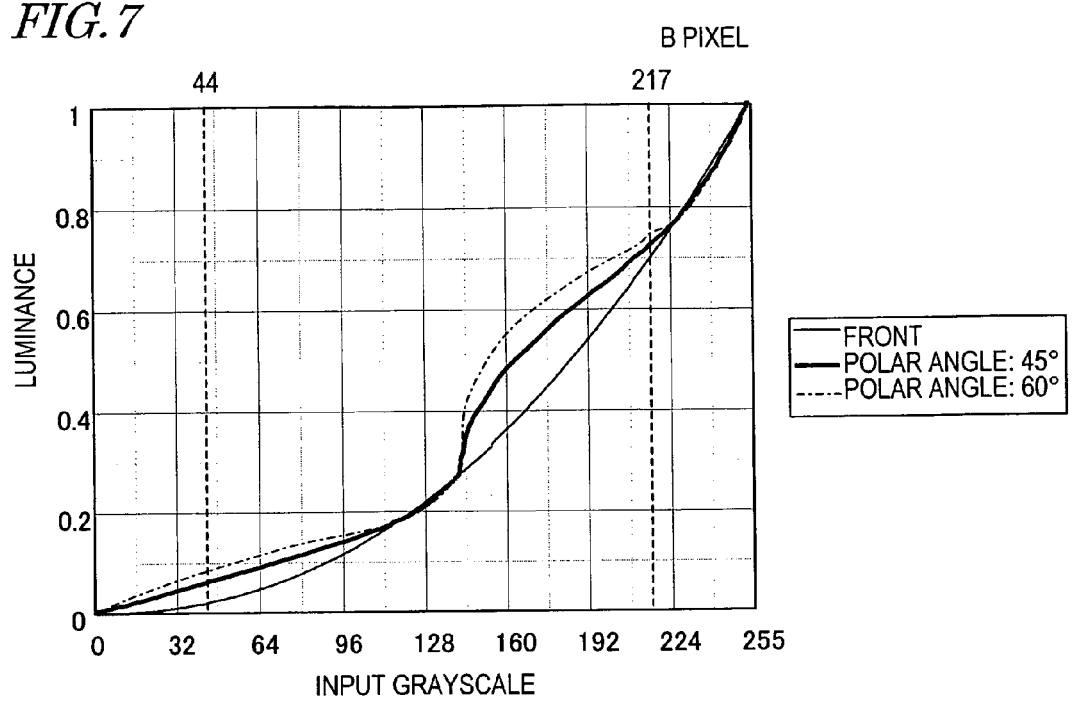
FIG. 7 is a graph showing the grayscale characteristics of a B pixel of the liquid crystal display device according to the embodiment of the present invention.

By contrast, in the liquid crystal display device in this embodiment, for example, SR1 is set to 0.54, SG1 is set to 0.27, and SB1 is set to 0.20. FIG. 5 shows the grayscale characteristics of the R pixel, FIG. 6 shows the grayscale characteristics of the G pixel, and FIG. 7 shows the grayscale characteristics of the B pixel. FIGS. 5 through 7 show the grayscale characteristics at the front viewing angle, the oblique 45° viewing angle, and the oblique 60° viewing angle.

As shown in FIG. 5, in the case of the R pixel having the SR1 of 0.54, the grayscale characteristics at the oblique 45° viewing angle and the oblique 60° viewing angle match the grayscale characteristic at the front viewing angle (in this example, a curve of γ=2.2) when the input grayscale level is 192/255 or the vicinity thereof.

As shown in FIG. 6, in the case of the G pixel having the SG1 of 0.27, the grayscale characteristics at the oblique 45° viewing angle and the oblique 60° viewing angle match the grayscale characteristic at the front viewing angle when the input grayscale level is 140/255 or the vicinity thereof.

As shown in FIG. 7, in the case of the B pixel having the SB1 of 0.20, the grayscale characteristics at the oblique 45° viewing angle and the oblique 60° viewing angle match the grayscale characteristic at the front viewing angle when the input grayscale level is 120/255 or the vicinity thereof.

Accordingly, in the liquid crystal display device according to this embodiment of the present invention in which the SR1=0.54, SG1=0.27 and SB1=0.20, the color reproducibility of the skin color represented with an R pixel having a grayscale level of 192/255 or the vicinity thereof, a G pixel having a grayscale level of 140/255 or the vicinity thereof, and a B pixel having a grayscale level of 120/255 or the vicinity thereof scarcely depends on the viewing angle.

From the results shown in Table 1, the viewing angle dependence of the skin color reproducibility can be decreased in the following case: the R pixel has the point, at which the input grayscale vs. luminance curve at the front viewing angle matches the input grayscale vs. luminance curve at the oblique 45° viewing angle, within the grayscale level range of 105/255 or greater and 255/255 or less; the G pixel has the point, at which the input grayscale vs. luminance curve at the front viewing angle matches the input grayscale vs. luminance curve at the oblique 45° viewing angle, within the grayscale level range of 52/255 or greater and 223/255 or less; and the B pixel has the point, at which the input grayscale vs. luminance curve at the front viewing angle matches the input grayscale vs. luminance curve at the oblique 45° viewing angle, within the grayscale level range of 44/255 or greater and 217/255 or less. The "point at which the input grayscale vs. luminance curve at the front viewing angle matches the input grayscale vs. luminance curve at the oblique 45° viewing angle" is considered to be the point at which the voltage applied to the second sub-pixel reaches the threshold signal voltage. Therefore, in order to fulfill the above-described relationships, SR1, SG1 and SB1 need to fulfill the relationships of $0.15<SR1\leq1.00$, $0.03<SG1<0.75$, and $0.02<SB1<0.71$ as shown in Table 2.

TABLE 2

|   | Dark | | Bright | |
|---|------|------|--------|------|
|   | A | B | A | B |
| R | 0.15 | 0.85 | 1 | 0 |
| G | 0.03 | 0.97 | 0.75 | 0.25 |
| B | 0.02 | 0.98 | 0.71 | 0.29 |

In addition, from the viewpoint that the skin color of young women deviates less than the memory colors (Hideaki CHIJIIWA, Shikisaigaku Gairon (An Outline of Color Science), Tokyo University Press, page 130), it is more preferable to fulfill the relationships of $0.42<SR1\leq0.95$, $0.22<SG1<0.78$, and $0.15<SB1<0.44$. The "point at which the input grayscale vs. luminance curve at the front viewing angle matches the input grayscale vs. luminance curve at the oblique viewing angle" refers to a point at which the luminance at the oblique viewing angle is within ±1% of the luminance at the front viewing angle. Where the luminance at the oblique viewing angle is within ±1% of the luminance at the front viewing angle, a change of even a skin color which is important as a memory color is scarcely recognized. The oblique viewing angle (polar angle) may be any angle up to 45° because this range of angles encompasses most forms of usual TV uses. In uses where a wider viewing angle is especially desired, it is desirable that the grayscale characteristic at the oblique 60° viewing angle matches the grayscale characteristic at the front viewing angle. It is not absolutely necessary that the input grayscale vs. luminance curve at the front viewing angle should match the input grayscale vs. luminance curve at the oblique viewing angle. As long as the point at which the voltage applied to the second sub-pixel reaches the threshold signal voltage is within the above-described range, a change of the skin color is prevented from being recognized.

In the above embodiment, the grayscale level at which the viewing angle characteristic is optimized is adjusted by changing the area ratio between the first sub-pixel SP1 and the second sub-pixel SP2 of each of the three primary colors (in this example, R, G and B). Substantially the same effect is provided by adjusting the ratio of the time period in which the first sub-pixel SP1 is lit up with respect to one vertical scanning period. The "one vertical scanning period" is a period defined for the liquid crystal display device and is not a period defined by the input video signal. The "one vertical scanning period" refers to a period from when a signal voltage is supplied to a certain pixel until a signal voltage is supplied the next time. For example, one frame of an NTSC signal is 33.3 ms, but generally in liquid crystal display devices, signal voltages are written to all the pixels within ½ frame of the NTSC signal, i.e., within 1 field (16.7 ms). In this case, one vertical scanning period of the liquid crystal display device is 16.7 ms. When the liquid crystal display device is driven at twice the speed for the purpose of, for example, improving the response characteristic, one vertical scanning period of the liquid crystal display device is further halved to 8.4 ms.

Now, another embodiment according to the present invention in which the pixel division structure described in Patent Documents 1 through 3 is adopted as in the above embodiment and also time division is adopted will be described below.

Figure 8:
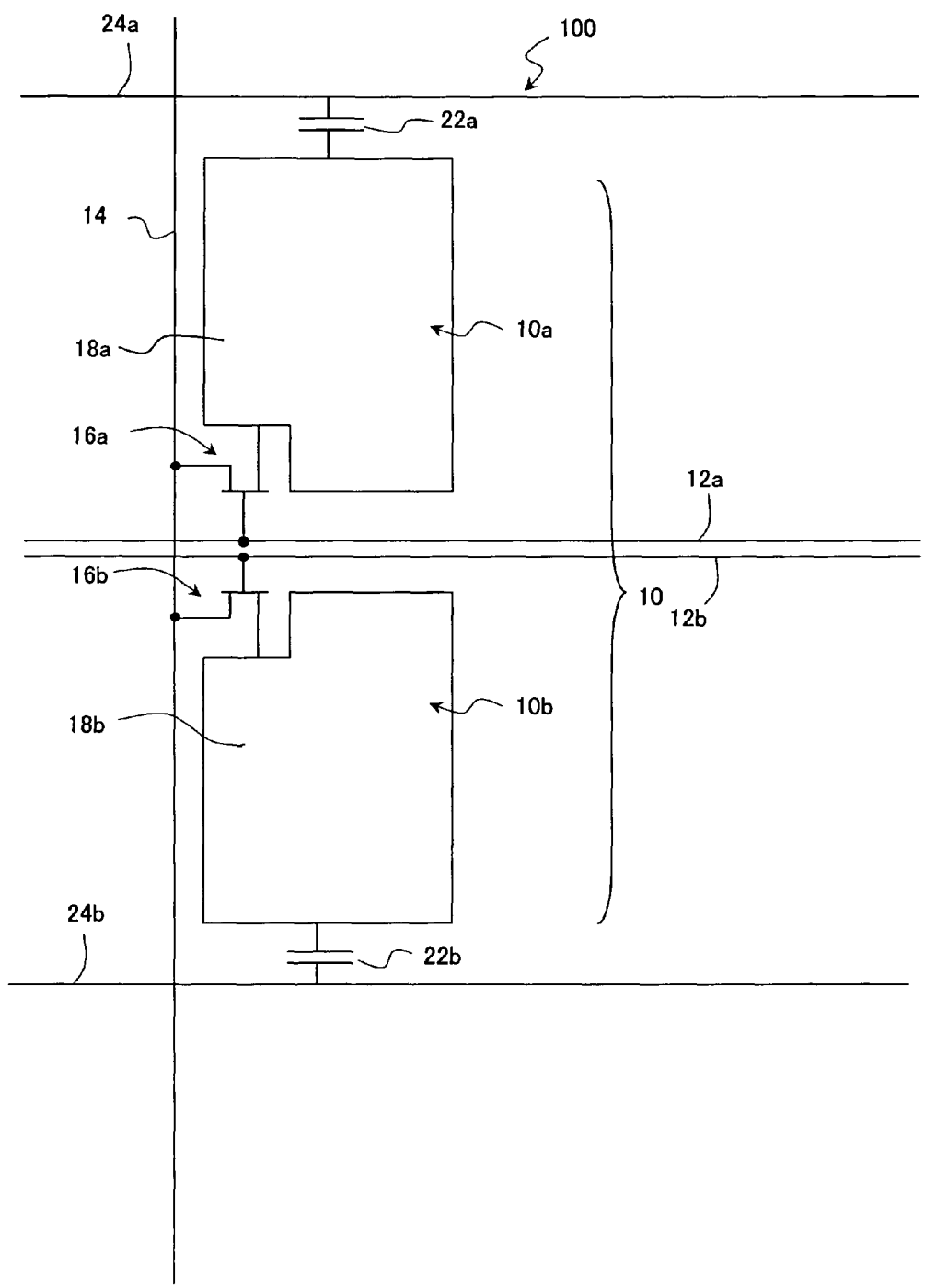
FIG. 8 schematically shows a structure of one pixel 10 of a liquid crystal display device 100 according to another embodiment of the present invention.

FIG. 8 schematically shows a structure of one pixel 10 of a liquid crystal display device 100 according to such another embodiment of the present invention.

The pixel 10 is divided into sub-pixels 10a and 10b, and the sub-pixels 10a and 10b are respectively connected to TFTs 16a and 16b and storage capacitances (CS) 22a and 22b. Gate electrodes of the TFTs 16a and 16b are respectively connected to scanning lines 12a and 12b, and source electrodes of the TFTs 16a and 16b are connected to a common (same) signal line 14. The storage capacitances 22a and 22b are respectively connected to storage capacitance lines (CS bus lines) 24a and 24b. The storage capacitances 22a and 22b are respectively formed of storage capacitance electrodes electrically connected to sub-pixel electrodes 18a and 18b respectively, storage capacitance counter electrodes electrically connected to the storage capacitance lines 24a and 24b respectively, and an insulating layer (not shown) provided between the storage capacitance electrodes and the storage capacitance counter electrodes. The storage capacitance counter electrodes of the storage capacitances 22a and 22b are independent from each other and are respectively supplied with storage capacitance counter voltages, different from each other, from the storage capacitance lines 24a and 24b. The electric connections of this liquid crystal display device are the same as those in the above described embodiment (FIG. 12 of Patent Document 1) except that the gate electrodes of the TFTs 16a and 16b are respectively connected to scanning lines 12a and 12b, which are independent from each other.

In the liquid crystal display device 100 in this embodiment, the TFT 16a of the sub-pixel 10a and the TFT 16b of the sub-pixel 10b are respectively connected to the scanning lines 12a and 12b, which are electrically independent from each other. Therefore, the time to start lighting up the sub-pixel 10a can be shifted from the time to start lighting up the sub-pixel 10b. Thus, the ratio of the time period in which the sub-pixel 10a is lit up with respect to one vertical scanning period can be adjusted. It is here assumed that the sub-pixel 10a is the first sub-pixel SP1, the sub-pixel 10b is the second sub-pixel SP2, and the ratio of the lighting-up time period of the first sub-pixel SP1 with respect to one vertical scanning period in each of the R pixel, the G pixel and the B pixel is TR1, TG1 and TB1. Where TR1, TG1 and TB1 are adjusted to be TR1>TG1>TB1, the same effect as that of the above embodiment can be provided even when the area ratio between the first sub-pixel SP1 and the second sub-pixel SP2 is 1:1 in all the R pixel, the G pixel and the B pixel. Namely, the area ratio (e.g., SR1) in the above embodiment and the ratio of the lighting-up time period (e.g., TR1) in this embodiment are equivalent in the influence made on the grayscale characteristic.

Accordingly, the liquid crystal display device 100 in the shown in FIG. 8 can have a combination of the above two embodiments by adjusting the area ratio between the sub-pixels 10a and 10b.

It is assumed that the area ratio of the first sub-pixel SP1 in each of the R pixel, the G pixel and the B pixel is SR1, SG1 and SB1, and the ratio of the lighting-up time period of the first sub-pixel SP1 with respect to one vertical scanning period in each of the R pixel, the G pixel and the B pixel is TR1, TG1 and TB1. The above two embodiments can be combined by fulfilling the relationship of (SR1×TR1)>(SG1×TG1)>(SB1×TB1). Alternatively, the above two embodiments can be combined by adjusting the area ratio and/or the ratio of the lighting-up time period of the sub-pixel so as to fulfill the relationships of 0.15<(SR1×TR1)≦1.00, 0.03<(SG1×TG1)<0.75, and 0.02<(SB1×TB1)<0.71. In the case where the structure in which only the area ratio is adjusted, namely, the structure in which TR1, TG1 and TB1 are each 1.00 is adopted, there is an advantage that the two sub-pixels SP1 and SP2 (10a and 10b in FIG. 8) can be driven by one scanning line and thus the structure of the liquid crystal display device is simplified.

The present invention can preferably utilize the space-wise pixel division technique described in Patent Documents 1 through 3. The present invention can also utilize the space-wise pixel division techniques described in, for example, Japanese Laid-Open Patent Publications No. 5-289108 and 2004-213011 or a combination of the above-described techniques. As described above, a time-wise pixel division technique (e.g., Patent Document 4) may be utilized, or a combination of a time-wise pixel division technique and a space-wide pixel division technique may be utilized.

Japanese Patent Application No. 2005-276419 upon which the present application claims the benefit of priority, Patent Documents 1 through 4, Japanese Laid-Open Patent Publications Nos. 5-289108 and 2004-213011 are entirely incorporated herein by reference.

INDUSTRIAL APPLICABILITY

The present invention is preferably usable for liquid crystal display devices, especially for liquid crystal display devices for TVs.

The invention claimed is:

1. A liquid crystal display device, comprising:
a plurality of pixels each connected to a signal line via a switching element; wherein
each of the plurality of pixel includes a first sub pixel and a second sub pixel having voltage vs. luminance characteristics different from each other with respect to a signal voltage supplied from the signal line, a threshold signal voltage of the first sub pixel being lower than that of the second sub pixel;
the plurality of pixels form color display pixels including a red pixel, a green pixel and a blue pixel;
where the area ratio of the first sub pixel in each of the red pixel, the green pixel and the blue pixel is SR1, SG1 and SB1, and the ratio of a time period in which the first sub pixel of each of the red pixel, the green pixel and the blue pixel is lit up with respect to one vertical scanning period is TR1, TG1 and TB1, the relationship of (SR1×TR1)>(SG1×TG1)>(SB1×TB1) holds, and wherein SR1>SG1>SB1.

2. The liquid crystal display device of claim 1, wherein the relationships of 0.15<(SR1×TR1)≦1.00, 0.03<(SG1×TG1)<0.75, and 0.02<(SB1×TB1)<0.71 are fulfilled.

3. The liquid crystal display device of claim 1, wherein the ratio of the time period in which the first sub pixel of each of the red pixel, the green pixel and the blue pixel is lit up with respect to one vertical scanning period, i.e., TR1, TG1 and TB1, are each 1.00.

4. A liquid crystal display device, comprising:
a plurality of pixels each electrically connected to a signal line via a switching element;
wherein each of the plurality of pixel includes a first sub pixel and a second sub pixel having voltage vs. luminance characteristics different from each other with respect to a signal voltage supplied from the signal line, a threshold signal voltage of the first sub pixel being lower than that of the second sub pixel;
wherein the plurality of pixels form color display pixels including a red pixel, a green pixel and a blue pixel;
wherein the area ratio of the first sub pixel in each of the red pixel, the green pixel and the blue pixel is SR1, SG1 and SB1, and the ratio of a time period in which the first sub pixel of each of the red pixel, the green pixel and the blue pixel is lit up with respect to one vertical scanning period is TR1, TG1 and TB1, and the relationship of (SR1×TR1)>(SG1×TG1)=(SB1×TB1) is satisfied; and the red pixel has a point, at which an input grayscale vs. luminance curve at the front viewing angle matches an input grayscale vs. luminance curve at the oblique 45° viewing angle, within the grayscale level range of 105/255 or greater and 255/255 or less, the green pixel has a point, at which the input grayscale vs, luminance curve at the front viewing angle matches the input grayscale vs. luminance curve at the oblique 45° viewing angle, within the grayscale level range of 52/255 or greater and 223/255 or less, and the blue pixel has a point, at which the input grayscale vs. luminance curve at the front viewing angle matches the input grayscale vs. luminance curve at the oblique 45° viewing angle, within the grayscale level range of 44/255 or greater and 217/255 or less.

5. The liquid crystal display device of claim 4, wherein SR1>SG1>SB1.

6. The liquid crystal display device of claim 4, wherein the ratio of the time period in which the first sub pixel of each of the red pixel, the green pixel and the blue pixel is lit up with respect to one vertical scanning period, i.e., TR1, TG1 and TB1, are each 1.00.

* * * * *